(12) United States Patent
Paulsami et al.

(10) Patent No.: US 8,433,996 B2
(45) Date of Patent: Apr. 30, 2013

(54) HIERARCHICAL MODEL FOR WEB BROWSER NAVIGATION

(75) Inventors: Prabakar Paulsami, Tamil Nadu (IN); Bikram Singh Gill, Punjab (IN)

(73) Assignee: Oracle International Corporation, Redwood Shores, CA (US)

( * ) Notice: Subject to any disclaimer, the term of this patent is extended or adjusted under 35 U.S.C. 154(b) by 287 days.

(21) Appl. No.: 12/560,179

(22) Filed: Sep. 15, 2009

(65) Prior Publication Data

US 2011/0066982 A1    Mar. 17, 2011

(51) Int. Cl.
*G06F 17/00* (2006.01)
*G06F 3/00* (2006.01)
*G06F 3/048* (2006.01)

(52) U.S. Cl.
USPC ........... 715/206; 715/205; 715/738; 715/810; 715/830

(58) Field of Classification Search .................. 715/835, 715/810
See application file for complete search history.

(56) References Cited

U.S. PATENT DOCUMENTS

| | | | |
|---|---|---|---|
| 6,310,630 B1 | 10/2001 | Kulkarni et al. | |
| 6,667,751 B1 | 12/2003 | Wynn et al. | |
| 6,978,445 B2 | 12/2005 | Laane | |
| 2004/0003346 A1 | 1/2004 | Blaschke et al. | |
| 2004/0003351 A1* | 1/2004 | Sommerer et al. | 715/517 |
| 2004/0139143 A1* | 7/2004 | Canakapalli et al. | 709/200 |
| 2005/0086606 A1* | 4/2005 | Blennerhassett et al. | 715/760 |
| 2005/0132018 A1* | 6/2005 | Milic-Frayling et al. | 709/213 |
| 2009/0132907 A1* | 5/2009 | Shao et al. | 715/234 |

FOREIGN PATENT DOCUMENTS

WO    9934306 A1    7/1999

OTHER PUBLICATIONS

Mozilla Firefox, "Browsing Basics", Aug. 12, 2009, [online], [retrieved on Oct. 26, 2009]. Retrieved from the internet: <URL: http://support.mozilla.com/en-US/kb/Browsing+basics?style_mode=inpro>.
"Finding recently visited webpages", [online] [retrieved on Nov. 4, 2009]. Retrieved from Internet Explorer 8.0 help database.
S. Greenberg & A. Cockburn, "Getting Back to Back: Alternate Behaviors for a Web Browser's Back Button", [online], Mar. 1999, [retrieved on May 22, 2009]. Retrieved from the internet: <URL: www.cosc.canterbury.ac.nz/andrew.cockburn/papers/hfweb.pdf>.

(Continued)

*Primary Examiner* — Alvin Tan
*Assistant Examiner* — Rinna Yi
(74) *Attorney, Agent, or Firm* — Fliesler Meyer LLP

(57) ABSTRACT

Embodiments of the present invention enable navigation in a web browser to be supported by a session browse history. In embodiments, a session browse history may be an n-ary tree data structure. Embodiments of the present invention integrated into a browser enable a user to access a session browse history tree via browser UI displays such as a navigation bar, a main tool bar, or a combination thereof. In embodiments, a session browse history tree may be exported to persistent storage, and may be imported into and integrated with an active session browse history tree. In embodiments, a stored session browse history tree may be updated in response to handling a caught browser event such as a "browser refresh" event, and in response to processing a user-initiated "go to" request from the browser UI. In embodiments, a currently stored session browse history tree may be returned in response to a request received from the browser UI.

18 Claims, 17 Drawing Sheets

OTHER PUBLICATIONS

S. Greenberg, B. McKenzie, M. Moyle & S. Jones, "Current Projects: Web Navigation. Improving Web Page Revisitation: Analysis, Design, and Evaluation" [retrieved on Nov. 6, 2009]. Retrieved from the internet: <URL: www.cosc.canterbury.ac.nz/andrew.cockburn/web_navigation.html>.

A. Cockburn et al., "Improving Web Page Revisitation: Analysis, Design and Evaluation", [online], IT&Society, vol. 1, Issue 3, Winter 2003, pp. 159-183, [retrieved on Nov. 6, 2009]. Retrieved from the internet: <URL: www.stanford.edu/group/siqss/itandsociety/v01i03/v01i03a09.pdf>.

Alex Iskold, "Internet Explorer 7 Review", [online], Oct. 20, 2006, [retrieved from the Internet on Nov. 6, 2009]. Retrieved from the internet: <URL: www.readwriteweb.com/archives/internet_explorer7_review.php>.

* cited by examiner

HIERARCHICAL MODEL FOR WEB BROWSER NAVIGATION

COPYRIGHT NOTICE

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

A. Technical Field

The present invention pertains generally to web browsers, and relates more particularly to a hierarchical model for navigation in web browsers.

B. Background of the Invention

The widespread availability of a graphical web browser was in a large part responsible for the rapid expansion of the World Wide Web. Deployed as a software application, a web browser provides a user with a graphical user interface (GUI) from which to access information published to the Internet.

The GUI design of the pioneering web browser NCSA Mosaic was so intuitive that the browser made access to the web possible even for users who were not experienced with networks and software applications. Although many different web browser implementations exist today, and browsers are now used to access many different kinds of electronically published content, the current set of browsers all have a set of common GUI features that were present originally in NCSA Mosaic.

A large subset of the common browser GUI features support a user's navigation to electronically published content. Each piece of published content is identified by a Uniform Resource Identifier (URI), and a browser can be directed to a piece of content in response to a user entering that URI into the address bar of the browser GUI. Studies of web browser usage behavior have shown that, during a web browsing session, a typical user's navigation pattern (the user's web session browse history) is to visit and then re-visit a set of URIs frequently. Since URIs often are long and complex, it would be very tedious and time-consuming if the only way for a user to re-visit a URI required the user to re-enter the URI into the address bar of the browser's GUI. This is why an important subset of common browser GUI features enables a user to access a portion of the web session browse history so that a user may re-visit a URI by selecting from a displayed list of URIs that were previously visited during the browse session. Examples of these features include the navigation bar ("navbar"), presenting a Forward Button and a Back Button, and the session history display accessed from the main toolbar of the browser GUI.

Electronically published content is increasing in both amount and complexity. Because of the ubiquitous use of browsers to access electronically published content, it is important for a browser GUI to be able to provide optimally efficient navigation support to a user. Being able to provide efficient access to a comprehensive web session browse history is one way to accomplish this goal.

SUMMARY OF THE INVENTION

Embodiments of the present invention enable navigation in a web browser to be supported by a session browse history. In embodiments, a session browse history may be an n-ary tree data structure. Embodiments of the present invention integrated into a browser enable a user to access a session browse history tree via browser UI displays such as a navigation bar, a main tool bar, or a combination thereof. In embodiments, a session browse history tree may be exported to persistent storage, and may be imported into and integrated with an active session browse history tree. In embodiments, a stored session browse history tree may be updated in response to handling a caught browser event such as a "browser refresh" event, and in response to processing a user-initiated "go to" request from the browser UI. In embodiments, a currently stored session browse history tree may be returned in response to a request received from the browser UI.

In embodiments, a browser user interface (UI) comprising a navigation display that provides access to browse history may comprise a session forward icon that, in response to a user's selection of the icon, causes the navigation display to display a first portion of a tree-based session browse history comprising link nodes, the first portion corresponding to a set of link nodes that have been visited by the user after a currently visited link node; and a session backward icon that, in response to a user's selection of the icon, causes the navigation display to display a second portion of a tree-based session browse history comprising link nodes, the second portion corresponding to a set of link nodes that have been visited by the user before a currently visited link node. In embodiments, a tree-based session browse history may comprise link nodes, where each link node is associated with a Universal Resource Identifier (URI), and selection of a link node causes the browser to navigate to the URI associated with the link node. In embodiments, a first link node in the tree-based session browse history may have a set of one or more child link nodes, and the navigation display may comprise the first link node and an icon representing the presence of the set of child link nodes where, in response to the user selecting the icon, the navigation display is updated to comprise the first link node and at least some of the set of child link nodes.

In embodiments, the browser UI may further comprise a session browsing history icon that, in response to a user's selection of the icon, causes the navigation display to provide access to a complete tree-based session browse history. In embodiments, access to the complete tree-based session browse history may be provided by displaying a portion of the complete tree-based session browse history and an indicator that provides access to an undisplayed portion of the complete tree-based session browse history. In embodiments, the undisplayed portion is displayed in response to the user's selection of the indicator. In embodiments, the navigation display adjusts around a link node that is selected by the user.

In embodiments, the browser UI may further comprise a "save" icon that causes the tree-based session browse history to be saved in response to the user's selection of the "save" icon; and an "open" icon that, in response to the user's selection of the "open" icon, allows the user to select a previously saved browser session history, and causes the selected session browse history to be added to the tree-based session browse history. In embodiments, the navigation display may be updated to display at least a portion of the saved tree-based session browse history that was imported.

In embodiments, the browser UI may further comprise a "back" session navigation icon that causes the browser to perform sequential navigation to a link node visited just prior to the currently visited link node in response to a user's selection of the icon; and a "forward" session navigation icon that causes the browser to perform sequential navigation to a link node visited just after the currently visited link node in response to the user's selection of the icon. In embodiments, the "back" or "forward" link node may be identified based on a current value of a path property of the tree-based session browse history.

In embodiments, a computer processing system for providing a navigation display within a browser UI may comprise a UI processor that dispatches a task processing request associated with input data to a request handler in response to receiving the input data from the browser UI, and that provides the navigation display within the browser UI in response to receiving a task processing result from a request handler; the request handler that generates a processing task result by executing a task comprising accessing the tree-based browse history in response to receiving the processing task request associated with the input data; and a browse history manager that accesses a stored representation of the tree-based browse history in response to receiving a browse history access request from the request handler. In embodiments, the navigation display may comprise a session forward icon that, in response to a user's selection of the icon, causes the navigation display to display a first portion of a tree-based session browse history comprising link nodes, the first portion corresponding to a set of link nodes that have been visited by the user after a currently visited link node; and a session backward icon that, in response to a user's selection of the icon, causes the navigation display to display a second portion of a tree-based session browse history comprising link nodes, the second portion corresponding to a set of link nodes that have been visited by the user before a currently visited link node. In embodiments, a tree-based session browse history may comprise link nodes, where each link node is associated with a URI.

In embodiments, the processing task request specifies updating the tree-based session browse history, and executing the processing task may comprise retrieving a stored representation of the tree-based session browse history from data storage; adding a link node associated with a URI that is not represented by a link node in the tree-based session browse history if the input data comprises the URI; updating a set of properties associated with the tree-based session browse history; and storing a representation of the updated tree-based history in data storage. In embodiments, the set of properties may comprise "current node" and "current path." In embodiments, adding a link node to the tree-based session browse history may comprise creating the link node; identifying a second link node within the tree-based session browse history that is currently being visited by the browser; and adding the first link node to a set of child link nodes associated with the second link node.

In embodiments, the computer processing system may further comprise an on-event listener that dispatches a task processing request associated with a browser-generated event to the request handler in response to receiving the event.

In embodiments, a computer program product may provide a method for providing a navigation display that provides access to browse history, and the method may comprise providing a session forward icon that, in response to a user's selection of the icon, causes the navigation display to display a first portion of a tree-based session browse history comprising link nodes, the first portion corresponding to a set of link nodes that have been visited by the user after a currently visited link node; and providing a session backward icon that, in response to a user's selection of the icon, causes the navigation display to display a second portion of a tree-based session browse history comprising link nodes, the second portion corresponding to a set of link nodes that have been visited by the user before a currently visited link node. In embodiments, a tree-based session browse history may comprise link nodes, where each link node is associated with a Universal Resource Identifier (URI), and selection of a link node causes the browser to navigate to the URI associated with the link node. In embodiments, a first link node in the tree-based session browse history may have a set of one or more child link nodes, and the navigation display may comprise the first link node and an icon representing the presence of the set of child link nodes where, in response to the user selecting the icon, the navigation display is updated to comprise the first link node and at least some of the set of child link nodes.

In embodiments, the method may further comprise providing a session browsing history icon that, in response to a user's selection of the icon, causes the navigation display to provide access to a complete tree-based session browse history. In embodiments, access to the complete tree-based session browse history may be provided by displaying a portion of the complete tree-based session browse history and an indicator that provides access to an undisplayed portion of the complete tree-based session browse history. In embodiments, the undisplayed portion is displayed in response to the user's selection of the indicator. In embodiments, the navigation display adjusts around a link node that is selected by the user.

In embodiments, the method may further comprise providing a "save" icon that causes the tree-based session browse history to be saved in response to the user's selection of the "save" icon; and providing an "open" icon that, in response to the user's selection of the "open" icon, allows the user to select a previously saved browser session history, and causes the selected session browse history to be added to the tree-based session browse history. In embodiments, the navigation display may be updated to display at least a portion of the saved tree-based session browse history that was imported.

In embodiments, the method may further comprise providing a "back" session navigation icon that causes the browser to perform sequential navigation to a link node visited just prior to the currently visited link node in response to a user's selection of the icon; and providing a "forward" session navigation icon that causes the browser to perform sequential navigation to a link node visited just after the currently visited link node in response to the user's selection of the icon. In embodiments, the "back" or "forward" link node may be identified based on a current value of a path property of the tree-based session browse history.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
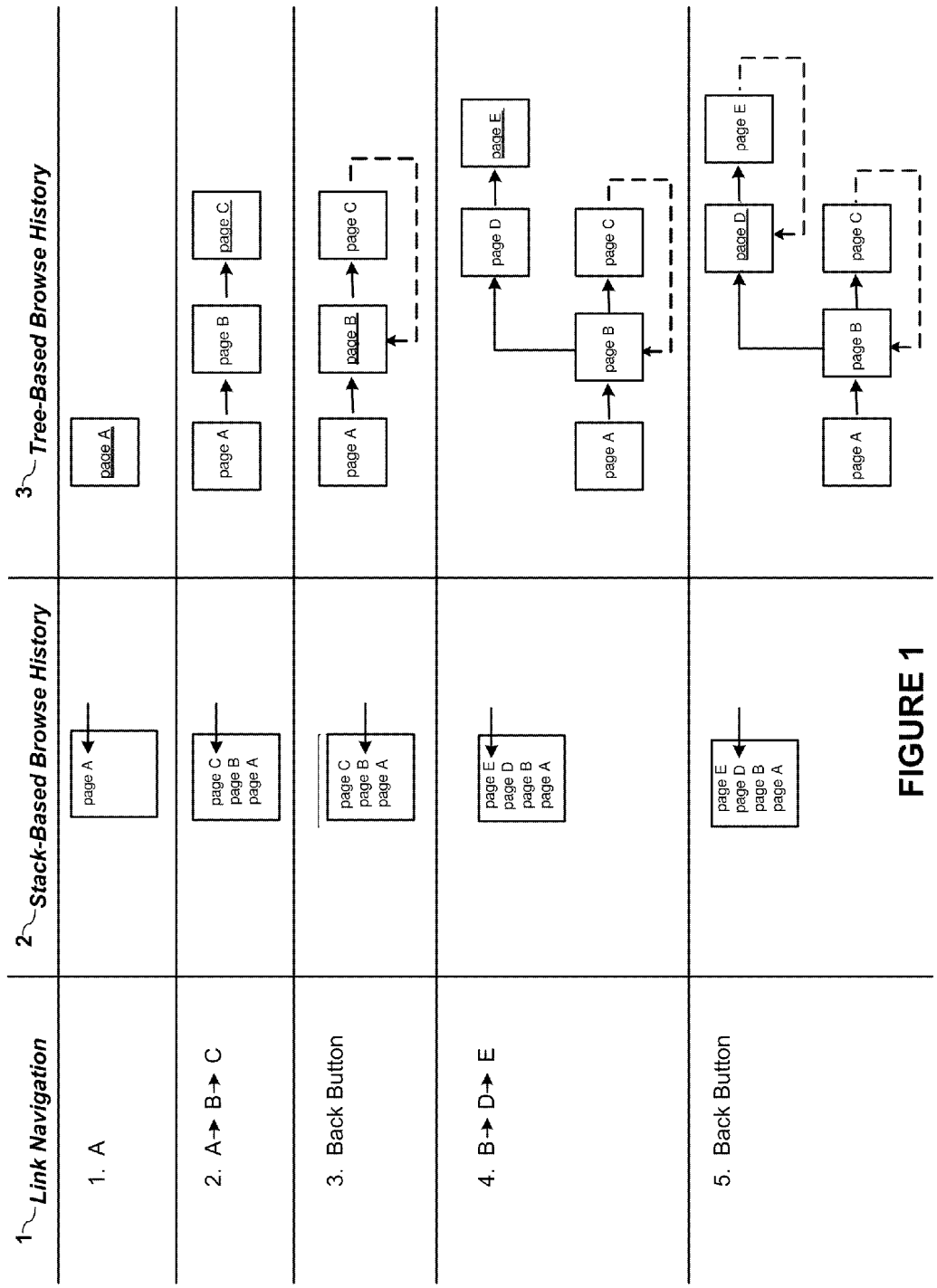
FIG. 1 illustrates a stack-based browse history and a tree-based browse history of an exemplary link navigation scenario according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

A. Overview

It is well known to those skilled in the art that a web browser user typically re-visits web pages (each page ("link") is identified by a Uniform Resource Identifier ("URI")) during a web browsing session. The user's link navigation behavior may be represented as a user's session browse history data structure comprising a set of URIs visited by the user during a web browsing session. A user that has access to his/her session browse history is able to re-visit links more rapidly during the browsing session because the user desiring to re-visit a link is able to select the link from the browse history instead of being required to re-enter the link URI into the browser. Therefore, a navigation display such as a navigation bar ("navbar"), which facilitates link navigation by displaying a session browse history to a web browser user, is a ubiquitous user interface (UI) feature provided by web browsers.

An exemplary browser navigation display includes support for two types of user link navigation behavior based on a session browse history: 1) Sequential navigation in which a user may re-visit the links visited just prior to and/or just after the link currently displayed; and 2) Random access navigation in which a user may re-visit a link selected from a display of previously visited links.

Sequential navigation commonly is supported by providing icons called the "Forward Button" (enabling re-visiting of a link added to the browse history immediately after the currently displayed link) and the "Back Button" (enabling re-visiting of a link added to the browse history immediately before the currently displayed link). In various embodiments, each user selection (e.g., via a left-button mouse click) of a Forward Button icon navigates the browser to a link visited just after the link currently displayed, and each user selection of a Back Button icon navigates the browser to a link visited just prior to the link currently displayed.

Random access navigation commonly is supported within a navigation display by drop-down displays associated with the Forward Button and/or the Back Button icons. In an exemplary navbar random access navigation scenario, a user activates a drop-down display of a set of links in the order of visitation just prior to or just after the currently displayed link by selecting (e.g., via a right-button mouse click) either the Back Button or the Forward Button, respectively. The user then may select to re-visit any link within the drop-down display.

An exemplary user web browsing scenario based on using a navigation display is depicted in Table 1, and will be referenced for illustration purposes and not for limitation. The scenario starts at page A (the "root" page).

TABLE 1

An exemplary link navigation scenario.

| Link Navigation | Currently Displayed Link (After Step Completion) |
| --- | --- |
| 1. A | page A |
| 2. A -> B -> C | page C |
| 3. Back Button | page B |
| 4. B -> D -> E | page E |
| 5. Back Button | page D |

1. Stack-Based Browse History

A typical browser stores the URIs of the set of links visited by a user in a browse history data structure that is based on a stack model. It is well-known to those skilled in the art that a "stack" is a LIFO (last in, first out) data structure in which the elements are ordered linearly according to how recently they were added to the data structure. An element being added to a stack is "pushed" onto the stack (added to the top of the stack), and an element being removed from a stack is "popped" from the stack (removed from the top of the stack). A stack-based model of a browse history is a linear representation of the links visited by a user, with the most recently visited links being at the top of the stack. A "current" stack pointer is associated with the link currently being displayed in the browser to the user.

Employing sequential navigation via an exemplary navigation display based on a stack-based browse history, each user selection of a Forward Button icon would move the current stack pointer one position towards the top of the stack, and each user selection of a Back Button icon would move the current stack pointer one position towards the bottom of the stack. Employing random access navigation via an exemplary navigation display based on a stack-based browse history, the drop-down display of links associated with the Back Button contains the ordered set of links between the current stack pointer and the bottom of the stack. The drop-down display of links associated with the Forward Button contains the ordered set of links between the current stack pointer and the top of the stack.

FIG. 1 illustrates a stack-based browse history representation (column 2) after completion of each step (column 1) of the exemplary navigation scenario depicted in Table 1. The current stack pointer (indicating the currently displayed page) is depicted as an arrow.

Column 2 of FIG. 1 illustrates a limitation associated with link navigation that is based on a stack-based browse history. In Step 4, beginning when the current stack pointer indicates page B (i.e., page B is the page currently displayed by the browser), any links between the current stack pointer and the top of the stack (page C in this example) must be popped off the stack before the new links (pages D and E) that are added after the current stack pointer can be pushed onto the stack. Thus, after the completion of Step 4, page C has been removed from the browse history and no longer can be reached by either sequential or random access navigation based on that browse history. Using a navigation history based on a stack-based browse history, a user's selection of the Forward Button after Step 5 would navigate the user to page E, which the user also would see in a drop-down display associated with the Forward Button. A user's selection of the Back Button again after the completion of Step 5 would navigate the user to page B, and the user would see pages B and A in a drop-down display associated with the Back Button.

2. Hierarchical Tree-Based Browse History

As is well known to those skilled in the art, a tree-based data structure contains a hierarchical ordering of linked data nodes. A tree-based data structure is a connected graph, where each tree node is linked to a set of zero or more child nodes and at most one parent node. Each child node may be considered to represent a tree branch that originates from the parent node. An n-ary tree structure is one in which the tree can have any number of branches. A tree-based data structure begins with a "root" node (having no parent node) and grows (i.e., nodes are added) away from the root. In embodiments, a user's session browse history may be represented as an n-ary tree data structure. Each node of the structure comprises the URI of a visited link, and the node link has at most one parent node (the link visited just prior to the node link) and a set of zero or more child nodes (links visited just after the node link). Since an n-ary tree node may have more than one child node, a tree-based browse history does not share the limitation of a stack-based browse history in which branches from a link node are lost when new link nodes are added to the browse history.

Column 3 in FIG. 1 depicts a hierarchical tree-based browse history of the exemplary link navigation scenario depicted in Table 1. The solid arrows represent new child links added to the data structure, and the dashed arrows represent updated properties of the tree. The currently displayed page after completion of each step is underlined. It should be noted that, in contrast to the stack-based browse history depicted in column 2, the branch from page B to page C is not removed so that page C remains accessible within the tree-based browse history.

In embodiments, a browse history link node may further comprise a set of properties that provide additional information about the user's web browsing behavior. In embodiments, an exemplary property set may comprise a "path" property as well as "current path" and "current node" properties to represent navigation behavior that does not require adding new nodes to the tree. The dotted arrows depicted in Steps 3-5 of column 3 illustrate updating properties within the browse history after a "back" navigation step that does not require addition of new tree nodes.

3. Navigation Display of a Tree-Based Browse History

Embodiments of the present invention may be incorporated into a web browser to provide a navigation display of a tree-based browse history. FIGS. 2A, 2B, 2C, 3, and 4 illustrate exemplary views of a tree-based browse history of a navigation display within a web browser UI, which are presented for purposes of illustration and not for limitation. A web browser UI may present one or more views of a navigation display to a user. Those skilled in the art will recognize that there are a variety of designs for a navigation display, and that the choices for number and types of navigation display designs to incorporate into a web browser UI are not critical to the invention.

a) Web Browser Navbar Display

Figure 2A:
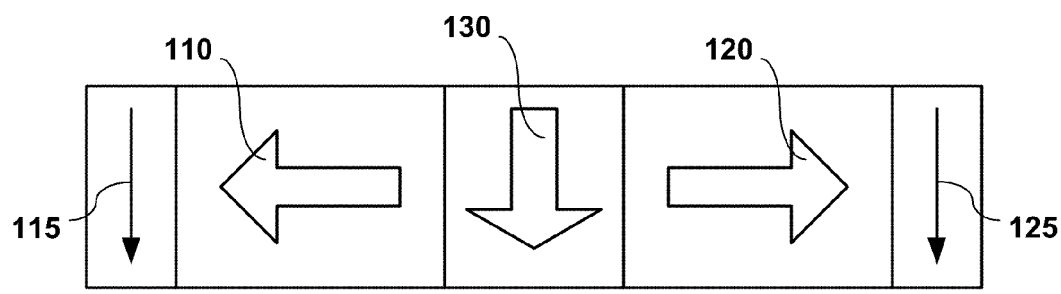
FIG. 2A illustrates an exemplary browser UI navigation display according to various embodiments of the invention.

FIG. 2A depicts an exemplary navbar browser navigation display that is provided by various embodiments of the invention. In embodiments, the navbar may comprise a Back Button icon 110, a drop-down menu icon 115 for display of links previously visited prior to the currently displayed link, a Forward Button icon 120, and a drop-down menu icon 125 for display of links previously visited subsequent to the currently displayed link. The navbar UI may further comprise a session browsing history drop-down menu icon 130, which enables a user to view at least a subset of a tree-based session browse history and select a link from that displayed history for random access navigation. Those skilled in the art will recognize that there are a variety of design choices for representing a navigation display icon (such as, for example, graphic symbols and/or text), and that the choice of icon design is not critical to the invention.

In embodiments, a user's selection of the navbar Back Button icon 110 and/or the Forward Button icon 120 facilitates sequential navigation to re-visit links within the tree-based browse history. At the completion of Step 5 in the exemplary link navigation scenario illustrated in FIG. 1, page D is the link currently displayed in the browser, and selection of the Back Button icon would navigate the browser to page B (the previously visited link in both the stack-based and tree-based browse histories) while selection of the Forward Button icon would navigate the browser to page E (the next visited link in both browse histories).

As previously discussed, a stack-based browse history stores the most recent linear browse history within a session, while a tree-based browse history stores all of the browse history branches created during the session. Thus, determination of the previous and subsequently visited links can be made directly from a stack-based browse history, but, in various embodiments, this determination may be derived from a tree-based browse history. For example, the determination may be based on properties, such as "current path" and "current node," of the tree-based browse history. Turning to the tree-based browse history illustrated for Step 5 in the link navigation scenario depicted in column 3 of FIG. 1, page B has two child nodes, page C and page D (i.e., page B is associated with two forward branches). If page B were the currently displayed link ("current node"), a "current path" property may be used to determine which of the child nodes was visited just prior to page B. Alternatively, in various embodiments, a separate stack-based path history may be maintained in addition to the tree-based browse history. Those skilled in the art will recognize that the implementation choice of path history maintenance is not critical to the invention.

Figure 2B:
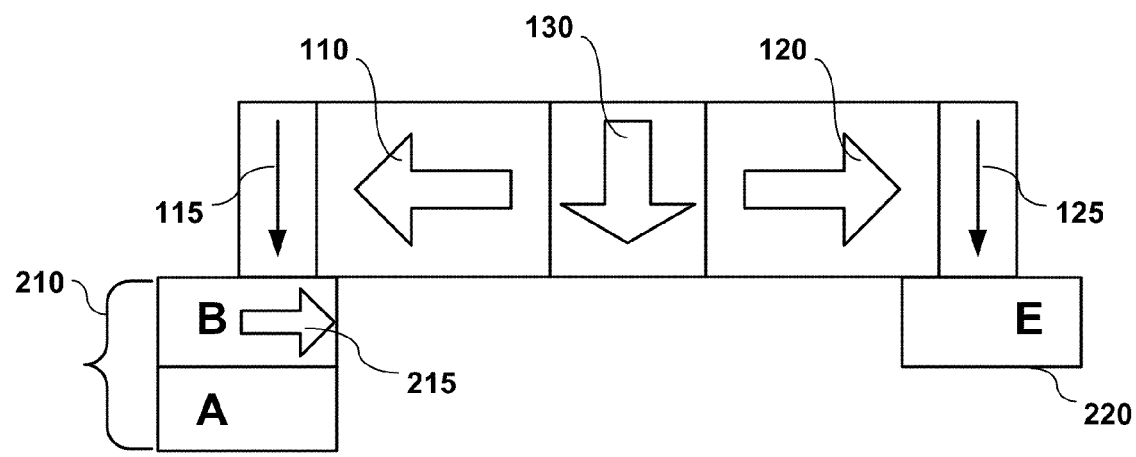
FIG. 2B illustrates an exemplary browser UI display of a tree-based browse history according to various embodiments of the invention.
Figure 2C:
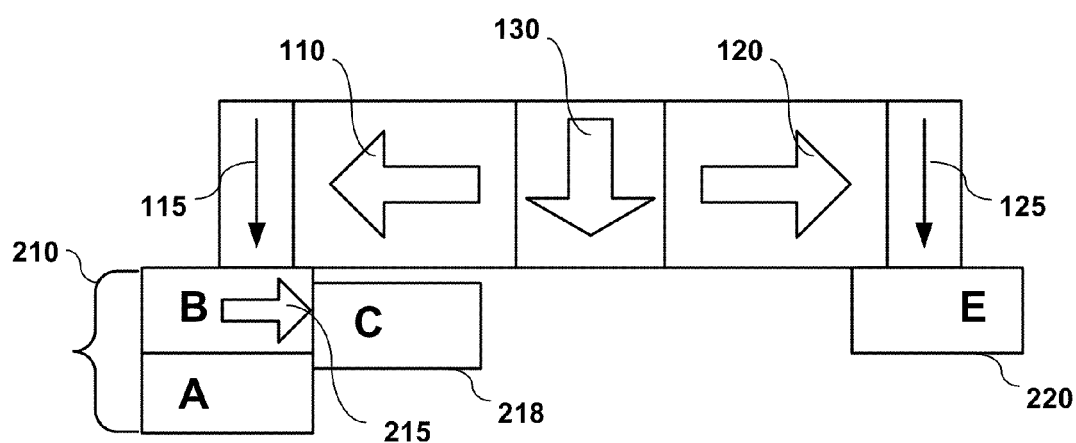
FIG. 2C illustrates an exemplary browser UI expanded display of a tree-based browse history according to various embodiments of the invention.
Figure 2D:
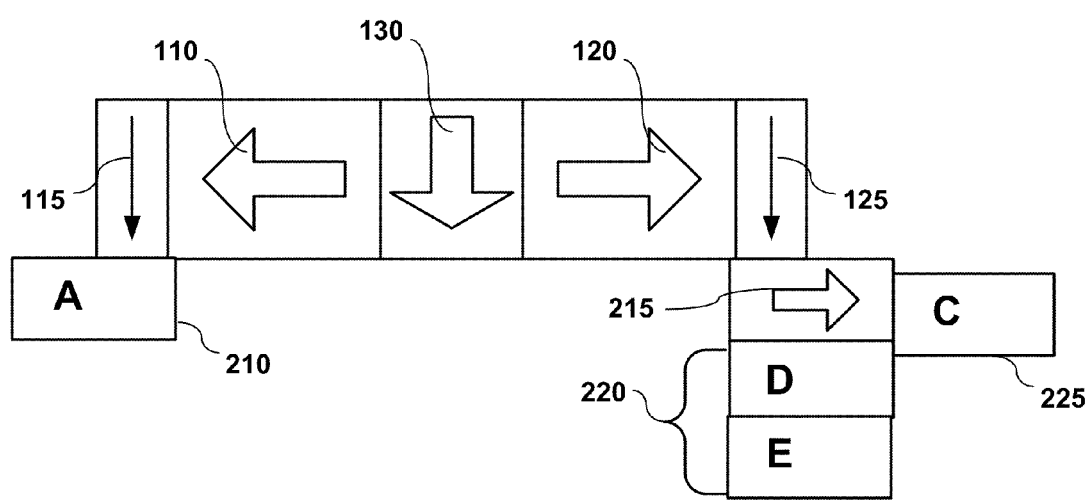
FIG. 2D illustrates a second exemplary browser UI expanded display of a tree-based browse history according to various embodiments of the invention.

FIGS. 2B and 2C illustrate exemplary navbar UI displays based on the tree-based browse history at the conclusion of Step 5 in the link navigation scenario depicted in column 3 of FIG. 1. As previously discussed, page D is the link currently displayed in the browser at completion of Step 5. In FIG. 2B, the navbar depicts the UI display produced after a user has selected the drop-down menu icons (115 and 125) associated with the Back Button 120 and the Forward Button 120, respectively. As previously described for a stack-based browse history, the drop-down menus list the links (210 and 220) that are visited most previously relative to the currently displayed link (page D). However, the presence of the additional branch from page B, which was removed from a stack-based browse history (See Step 4 in column 2), is indicated in the Back Button drop-down menu by a second Forward Button icon 215 that is associated with page B. In FIG. 2C, the navbar illustrates that page C 218 from that branch may be displayed and then reached via sequential navigation from page B after the user selects the second Forward Button icon 215. FIG. 2D illustrates a second exemplary navbar display of the tree-based browse history at the completion of Step 5 if page B were the page currently displayed in the browser. If a user selects the drop-down menu icon 115 associated with the Back Button, the most previously visited links 210 (page A) is displayed. If a user selects the drop-down menu icon 120 associated with the Forward Button, the second Forward Button icon 215 as well as the most recently visited links 220 (page D and page E) are displayed, and the second branch 225 containing page C may be displayed if the user selects the second Forward Button icon 215.

Figure 3:
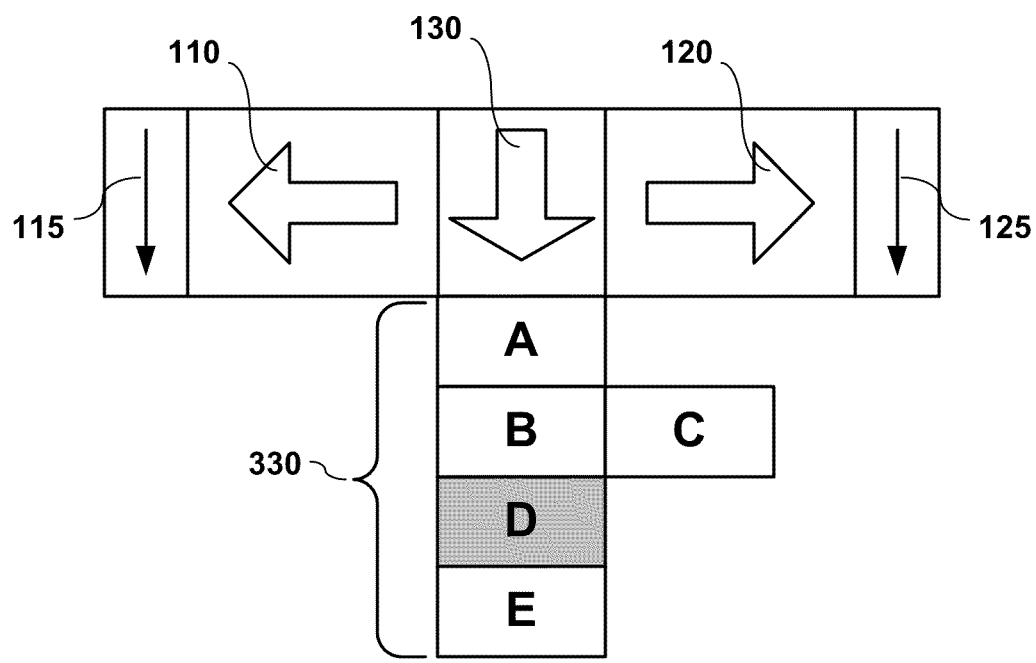
FIG. 3 illustrates an exemplary inverted tree display of a session browse history that is provided to a user after selection of the session browsing history drop-down menu icon from a browser UI display according to various embodiments of the invention.

FIG. 3 illustrates an exemplary tree display of a session browse history 330 that is provided to a user after selection of the session browsing history drop-down menu icon 130 from the navbar. The illustrated tree-based session browse history display 330 corresponds to the entire tree-based browse history at the conclusion of Step 5 of the link navigation scenario (See column 3).

The exemplary session browse history 330 is displayed as an "inverted tree" which has the root node at the top and each child link node on the "trunk" displayed below its parent link node. A child link node on a branch (such as page C in this example) is displayed horizontally adjacent to its parent link node. The currently displayed link (page D) is designated by color in this example. In embodiments, a tree-based session history display may be updated in response to a user's selection of a link on a branch (i.e., the selected link becomes the current node), so that the displayed tree centers on the newly selected current node.

Those skilled in the art will recognize that there are a variety of designs for a tree display, and that a choice of tree display design attributes is not critical to the invention. For example, in various embodiments of the invention, a tree display may be within a drop-down menu, a page frame display showing a hierarchical file tree display (such as the Microsoft Windows File Explorer display), a "tool tip" type of popup window, and/or displayed as a new browser page.

b) Web Browser Toolbar Drop-down Menu Display

Figure 4:
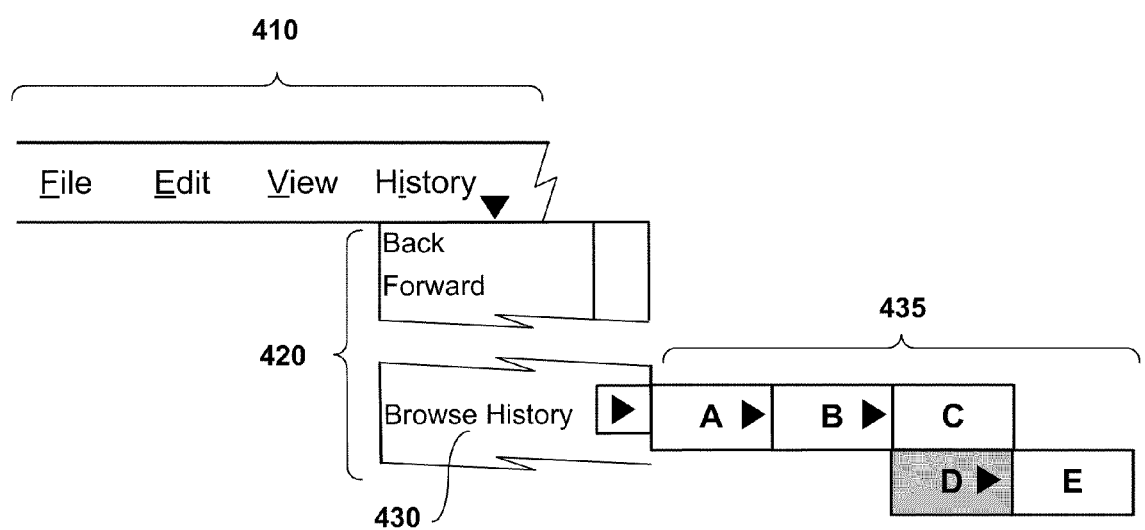
FIG. 4 illustrates an exemplary browse history navigation display that may be accessed via a web browser toolbar according to various embodiments of the invention.

FIG. 4 illustrates an exemplary browse history navigation display that may be accessed via a web browser toolbar according to various embodiments of the invention. A common choice presented in a web browser main toolbar 410 is a "History" drop-down menu. In embodiments, the "History" drop-down menu may present choices 420 for different views of subsets of previously visited URIs. Common choices from the "History" drop-down menu are "Back" and "Forward," which, when selected by a user, provide views of sets of links that are similar to the "Back" and "Forward" drop-down lists of links displayed from the navbar (210 and 220). In embodiments, the "History" drop-down menu choices 420 may support a user's sequential and/or random access navigation to previously visited links in the same way as previously described for a navbar.

In embodiments, a user may be provided with an interactive view of a tree-based browse session history 435 in response to selection of a "Browse History" choice 430 presented in the "History" drop-down menu 420. FIG. 4 illustrates an exemplary display 435, returned in response to selection of a "Browse History" choice 430, of the tree-based session browse history at the conclusion of Step 5 of the link navigation scenario (See column 3). As previously described, the session browse history contains two branches from page B, and it was noted that a traditional stack-based browse history has a limitation because it does not contain both branches. In the exemplary display 435, each level of the hierarchy is represented as a column, with the "root" node being at column 1 (the far left). Thus, a parent-child link connects the parent (column N) with the child (column N+1) along a row. In the diagram 435, page A (column 1) is linked to one child node, page B (column 2), and that is designated with an arrow icon. Page B also has child links, designated by an arrow icon. The two child links of page B (representing the two branches in the browse history) begin on separate rows in column 3. Page D, the link currently being displayed by the web browser, may be designated by color, as in this example, or another graphic design attribute.

In embodiments, one or more properties may be associated with a node within a tree-based session browse history, and at least a subset of the properties may be provided in a graphical display of the browse history to a user. For example, a number representing the number of times a link was visited during a browse session may be associated with the link title and/or URI. In various embodiments, lines and/or color may be used to encode other session history properties such as paths, frequency of re-visits, and the presence of a link in the user's browser bookmarks/favorites (along with an option to add the link to the browser bookmarks/favorites if it is not present).

In embodiments, the browser and/or its hosting computer may have limiting display capabilities that would prevent display of an entire session browse history. Therefore, a user may be provided with a means to select portions of the browse history tree display to expand or minimize, such as selecting the arrow icon associated with a node to display all of its child nodes.

In various embodiments, the browse history display 435 launched from the web browser main toolbar 410 may be the same display as the browse history display 330 launched from the browse session history icon 130 on the web browser navbar. Thus, a web browser UI may provide a user with multiple options to launch an interactive display of an entire browse session history.

4. Session Browse History Import/Export

In various embodiments, a tree-based user browse history instance may be represented as at least one XML document, although those skilled in the art will recognize that a variety of data representational schemes exist, and that the data representation scheme choice is not critical to the invention. In embodiments, a user browse history instance may be cached in the browser or on the computing platform on which the browser is executing while, in other embodiments, a user browse history instance may be exported to a persistent data store, such as a database, computer file system, or other external medium, so that the browse history instance may be archived.

In embodiments, a browse history instance that is stored in an industry standard representational scheme, such as XML, may be retrieved, interpreted, and then integrated into the browse history of an active browser session. In embodiments, a stored browse history instance may be retrieved and then transmitted to one or more browser instances that are executing on a variety of types of computing platforms that include personal computers and mobile computing devices.

Figure 5A:
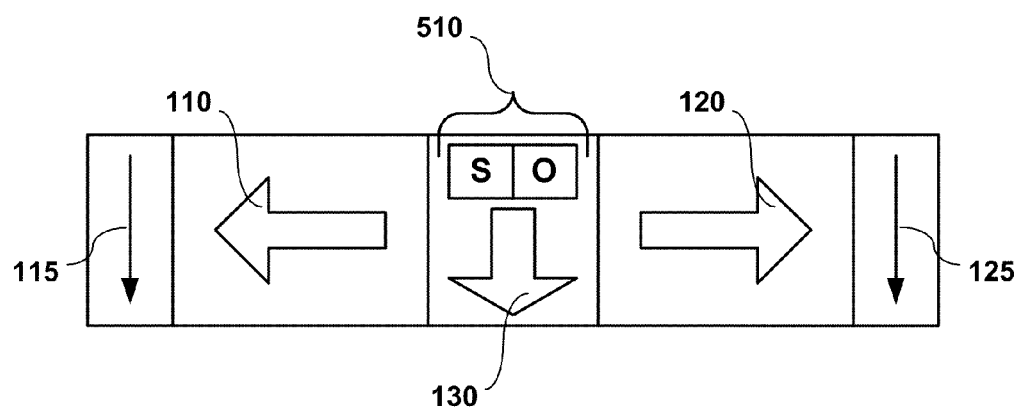
FIG. 5A illustrates exemplary browser navigation UI that enables a user to save and/or restore a user browse history instance according to various embodiments of the invention.

FIG. 5A depicts an exemplary browser navbar UI that enables a user to save and/or restore a user browse history instance according to various embodiments of the invention. In embodiments, a navbar may further comprise a save/restore icon 510. For example, in embodiments, a user may elect to export and save the current browse history to persistent storage by selecting an "S" (save) button on the icon. A user may elect to restore (import) a stored browse history instance into the browser by selecting an "O" (open) button on the icon.

Figure 5B:
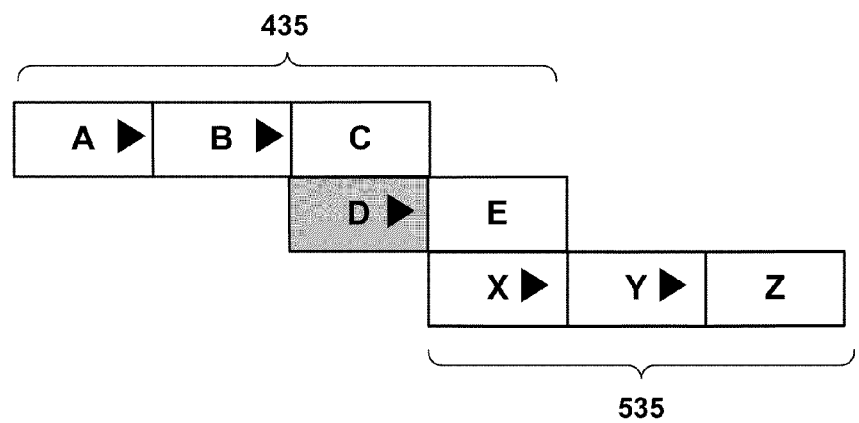
FIG. 5B depicts an exemplary display of a tree-based browse history into which an imported tree-based browse history has been integrated according to various embodiments of the invention.

In embodiments, an exemplary policy for integrating an imported tree-based browse history instance into an active tree-based browse history is to make the currently displayed node of the active browse history the parent of the root node of the imported browse history instance. FIG. 5B depicts, for purposes of illustration and not limitation, an exemplary display of a tree-based browse history into which an imported tree-based browse history has been integrated. Following the exemplary policy just described, an imported tree-based browse history 535 has been made a new branch from the currently displayed node (page D) of the currently active browse history 435.

B. System Implementations

Figure 6:
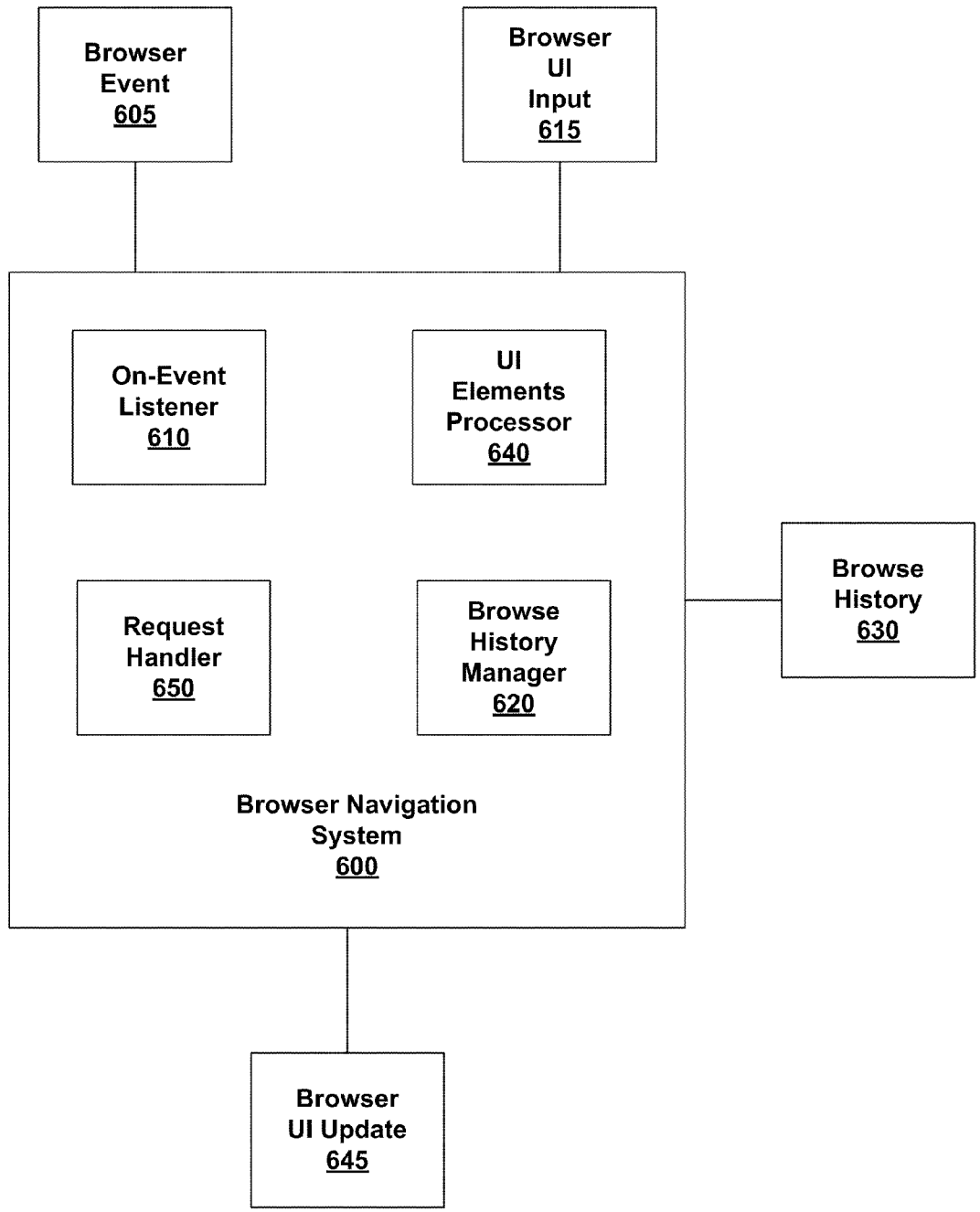
FIG. 6 depicts a block diagram of a browser navigation system according to various embodiments of the invention.

FIG. 6 depicts a browser navigation system 600 for maintaining a browse session history 630 in response to browser events 605 and/or web browser user input via the browser UI 615 according to various embodiments of the invention. Browser navigation system 600 comprises a browser on-event listener 610 that receives events from the browser; a UI elements processor 640 that receives input from the browser UI and returns a navigation display to the browser UI; a request handler 650 that receives a task request and/or input data from the browser on-event listener 610 and the UI elements processor 640 and executes the task request by accessing a stored browse history 630, and a browse history manager 620 that receives a browse history access request from the request handler 650 and accesses the stored browse history 630 in response to the request. Browser navigation system 600 may generate a browser UI update 645 in response to various inputs. Browser navigation system 600 will be discussed in further detail in the following sections.

1. Browser Navigation Module

Figure 7:
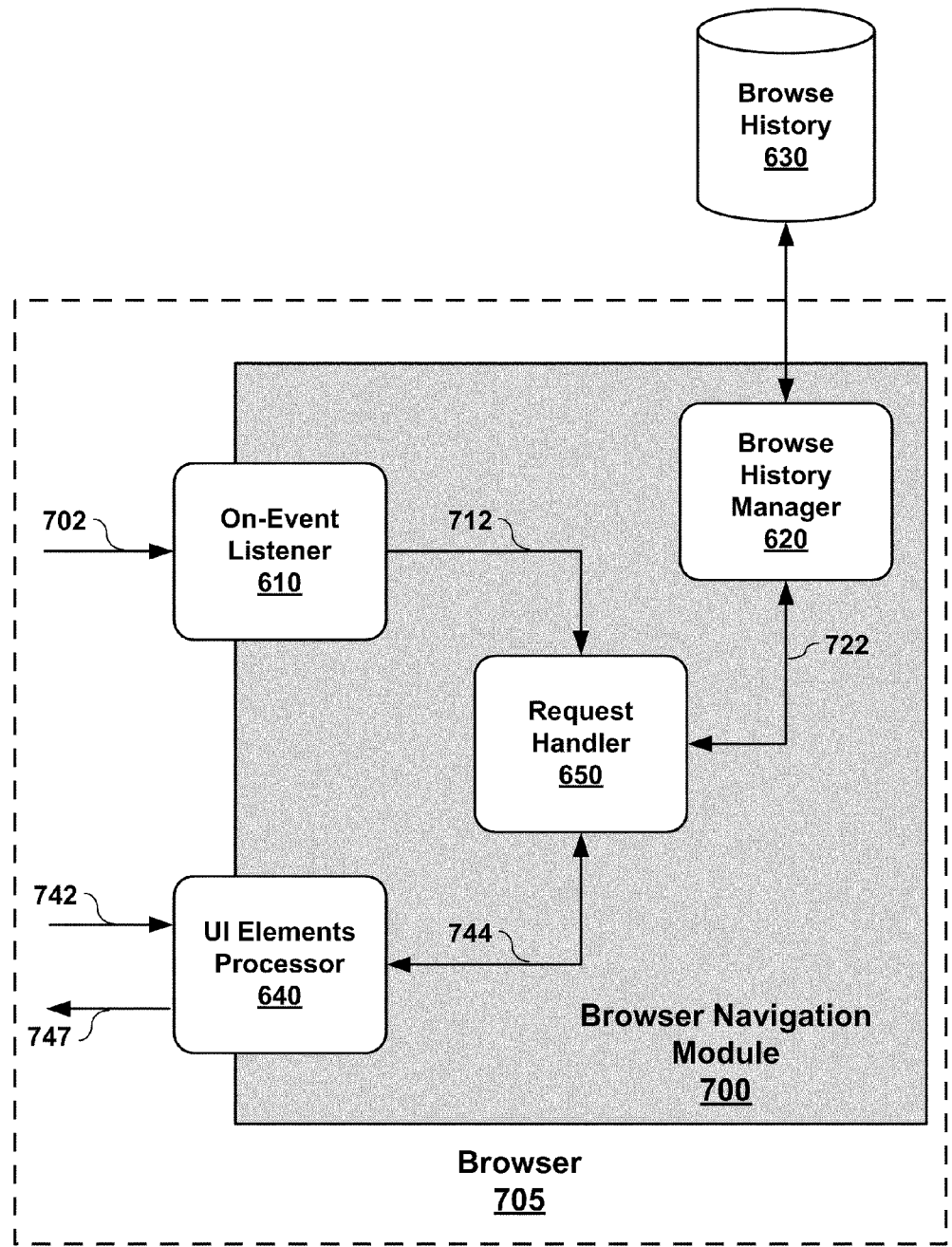
FIG. 7 depicts a block diagram of a browser navigation module for supporting user link navigation in a browser according to various embodiments of the invention.

FIG. 7 depicts a block diagram of a browser navigation module 700 for supporting user link navigation in a browser 705 based on a user session browse history according to various embodiments of the invention. Browser navigation module 700 may be implemented as embodiments of browser navigation system 600. Embodiments of browser navigation module 700 may be implemented as a core component of a browser 705, while other embodiments may be implemented as a separate component, such as a browser extension, add-in, or plugin, that is integrated into a browser 705. The type of implementation and deployment of the browser navigation module 700 is not critical to the invention.

In various embodiments, browser navigation module 700 may receive input from a web browser as browser events 702 and/or from a web browser user 742 via the browser UI elements (such as graphical user interface (GUI) widgets in the web browser application programming interface (API)). In embodiments, a request handler 650 is coupled 712 to an on-event listener 610 and coupled 744 to a UI elements processor 640 in order to receive processing requests and return processing results 747. In embodiments, an on-event listener 610 may generate a processing request in response to any of a designated subset of browser events that may include types of events generated directly by the browser (e.g., a browser refresh event) and types of events generated in response to processing a user request (e.g., a "go to" navigation event). In embodiments, a UI elements processor may generate a processing request in response to input from a set of one or more browser UI elements.

In various embodiments, a session browse history 630 may be cached within the web browser or its host computing platform, and/or the session browse history 630 may be stored persistently within data storage such as a database or file system. In embodiments, data within a stored session browse history may be accessed (e.g., updated and retrieved) by a browse history manager 620. In embodiments, a request handler 650 may access a browse history 630 via communication 722 with a browse history manager 620.

2. System for Handling Browser Events

Figure 8:
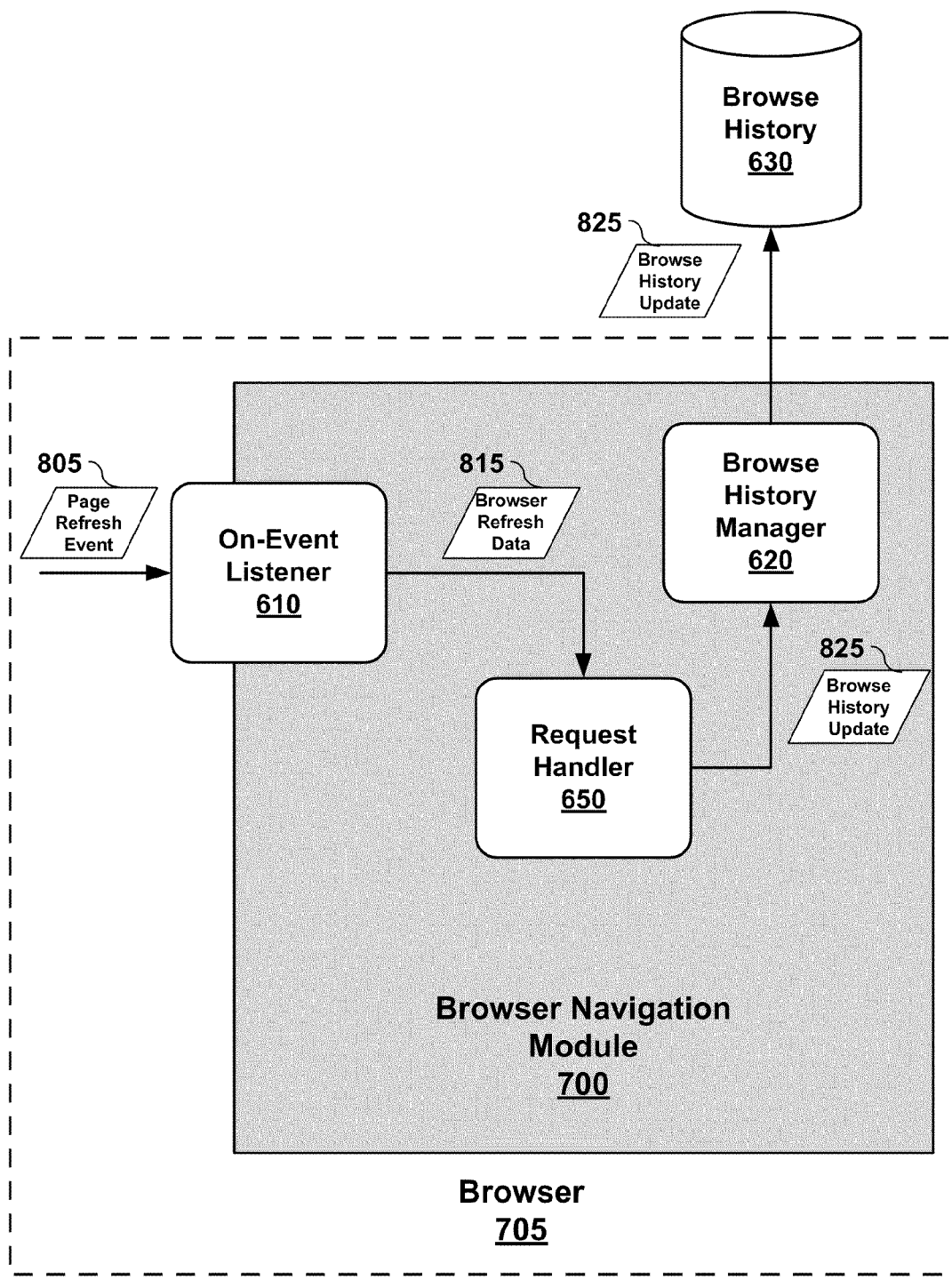
FIG. 8 depicts an exemplary scenario for a browser event handler to update a browse session history in response to a received browser event according to various embodiments of the invention.

FIG. 8 depicts an exemplary scenario, presented for illustration and not for limitation, for a browser navigation system 600 to update a tree-based browse session history 630 in response to a received browser event 605 according to various embodiments of the invention.

It is well known to those skilled in the art that a browser refresh event 805 (e.g., an event that signals updating the content of the currently displayed page) may be generated in response to different types of browse session tasks. In embodiments, a browser refresh event 805 may be categorized as 1) a "direct" event that is generated while processing a direct request by the user (e.g., a request entered by the user that specifies navigation to a new URI); and 2) an "indirect" event that is generated while processing the user's sequential navigation interaction with the Back Button and/or Forward Button, or processing the user's random access navigation request via selection from a display (such as a drop-down display or tree-based display) of session history links.

In embodiments, a browser refresh event 805 comprising browser refresh data 815 is received by the on-event listener 610. In embodiments, the browser refresh event type and the browser refresh data 815 are received by request handler 650, which transmits a browse history update 825 request to browse history manager 620. If the received browser refresh event 850 is a "direct" refresh event, the browse history update 825 comprises adding a new node to the browse history tree and updating tree properties such as current node and path. If the received browser refresh event 850 is an "indirect" refresh event, the browse history update 825 comprises updating tree properties such as current node and path, but the update does not comprise adding a new node to the browse history tree.

3. System for Handling UI Input

Figure 9:
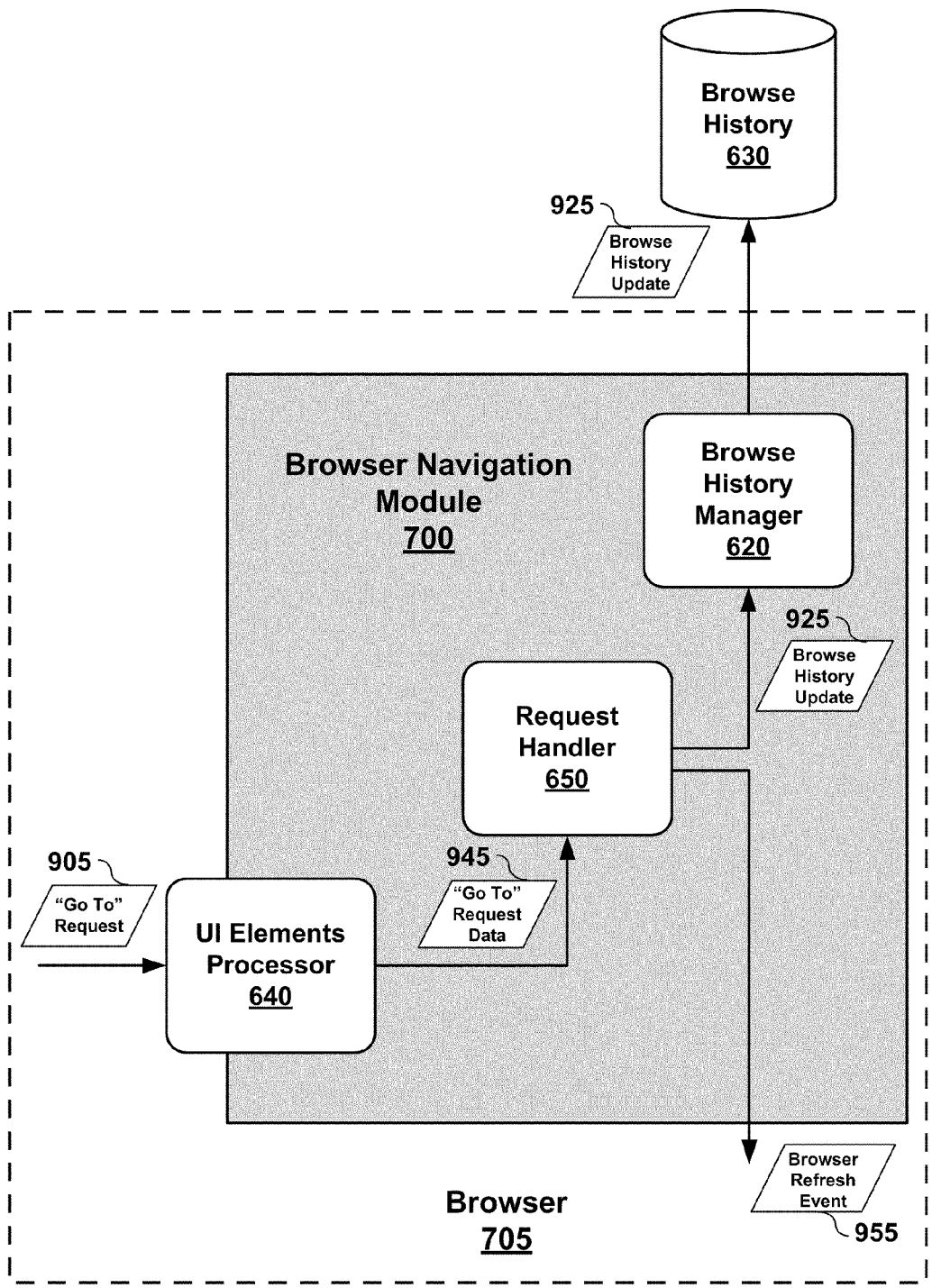
FIG. 9 depicts an exemplary scenario for processing a "go to" navigation request initiated by a user interacting with the browser UI according to various embodiments of the invention.
Figure 10:
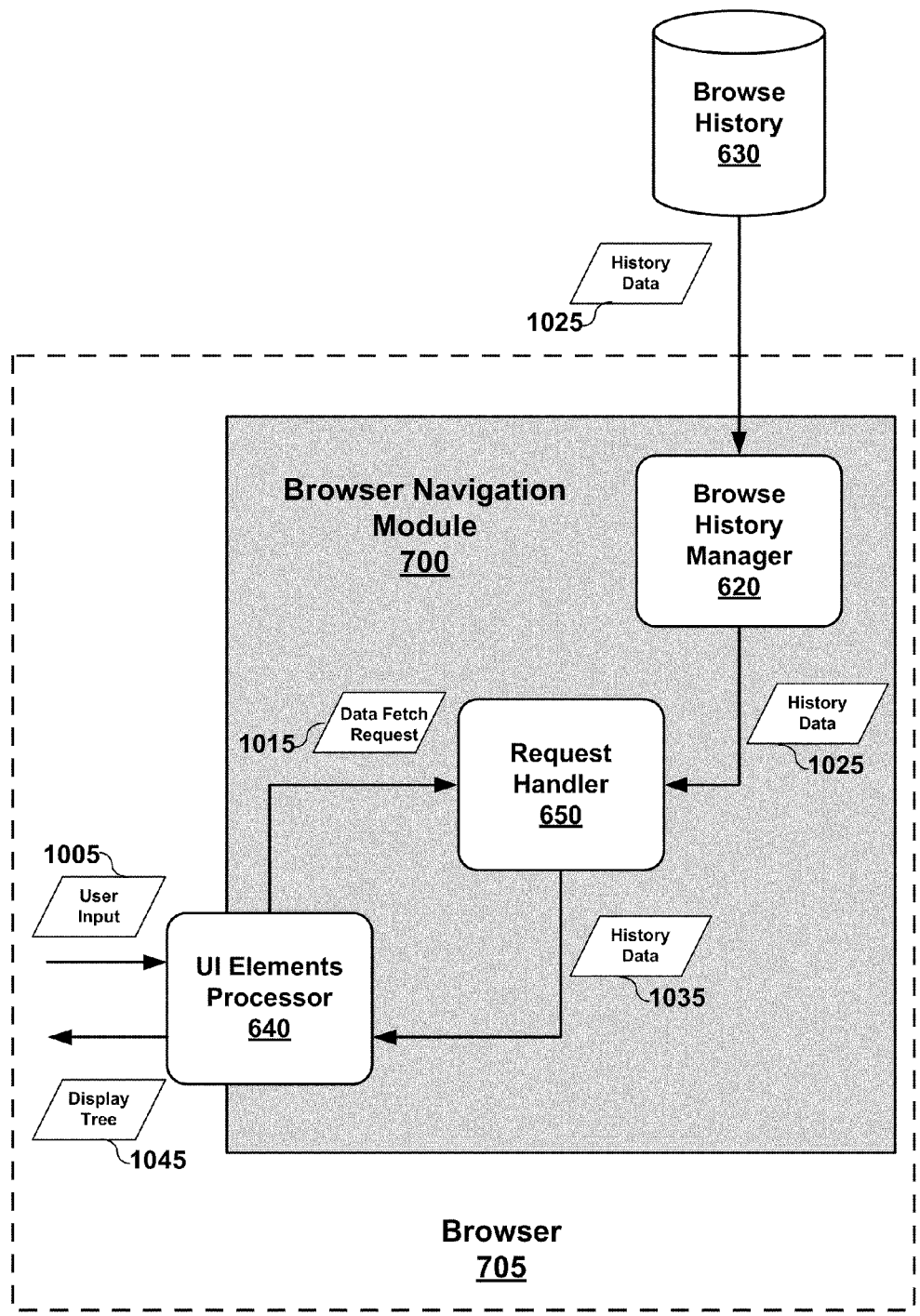
FIG. 10 depicts an exemplary scenario for processing a user request to view a display of the current session browse history according to various embodiments of the invention.

FIGS. 9 and 10 depict exemplary scenarios, presented for illustration and not for limitation, for a UI input handler 620 to process received web browser user input via the browser UI 615 according to various embodiments of the invention.

FIG. 9 depicts an exemplary scenario for processing a "go to" navigation request 905 initiated by a user interacting with the browser UI. As previously discussed, handling of this type of direct navigation request by request handler 650 results in a browse history update 925 comprising adding a new node to the browse history tree and updating tree node and path properties. Handling of this type of direct navigation request also comprises generating a browser refresh event 955 to be handled by the browser.

In embodiments, a generated browser refresh event 955 may be caught by on-event listener 610. Those skilled in the art will recognize that a variety of implementation choices exist for insuring that catching a generated browser refresh event 955 will not result in a second update of the browse history. For example, in embodiments, the "go to" request data 945 from the UI elements processor 640 may comprise the URI of the page from which the request initiated, and, during processing of the "go to" request data 945, the request handler 650 may cache that URI as the value of a "last browser page UI request" property. If the browser refresh data 815 of a subsequently received browser refresh event 805 comprise the same initiating page URI as the cached value of the "last browser page UI request" property, the request handler 650 will recognize that it had previously generated the browser refresh event 955. In embodiments, the request handler 650 will clear the cached property and will not process the event.

FIG. 10 depicts an exemplary scenario for processing a user request 1005 to view a display of the current session browse history tree 1045. Those skilled in the art will recognize that there is a variety of implementation choices for handling a data fetch request 1015. In embodiments, the data fetch request 1015 may be handled as a "pull" request by the request handler 650, so that the currently stored browse history data 1025 is retrieved from the browse history data store and returned as current browse history data 1035 in response to each received data fetch request 1015. In other embodiments, the request handler 650 may cache a copy of the browse history tree, and update the cached browse history tree by replacing it with an instance of the stored browse history 1025 after receiving a notification (e.g., via an event generated by the browse history 630 and/or by polling the browse history 630) that the stored browse history has been updated. Thus, the browse history data 1035 returned by the request handler 650 in response to a data fetch request 1015 is the cached browse history, and the browse history 630 is not accessed directly. Those skilled in the art will recognize that a variety of implementation choices exist for handling a data fetch request 1015, that an embodiment may comprise a plurality of implementations, and that the selection of an implementation is not critical to the invention.

C. Method Implementations

The following sections describe embodiments of methods for maintaining a tree-based browse session history in response to browser events and/or web browser user input via the browser UI according to various embodiments of the invention. The method embodiments may be implemented in embodiments of browser navigation system 600.

1. Method for Handling Browser Events

Figure 11:
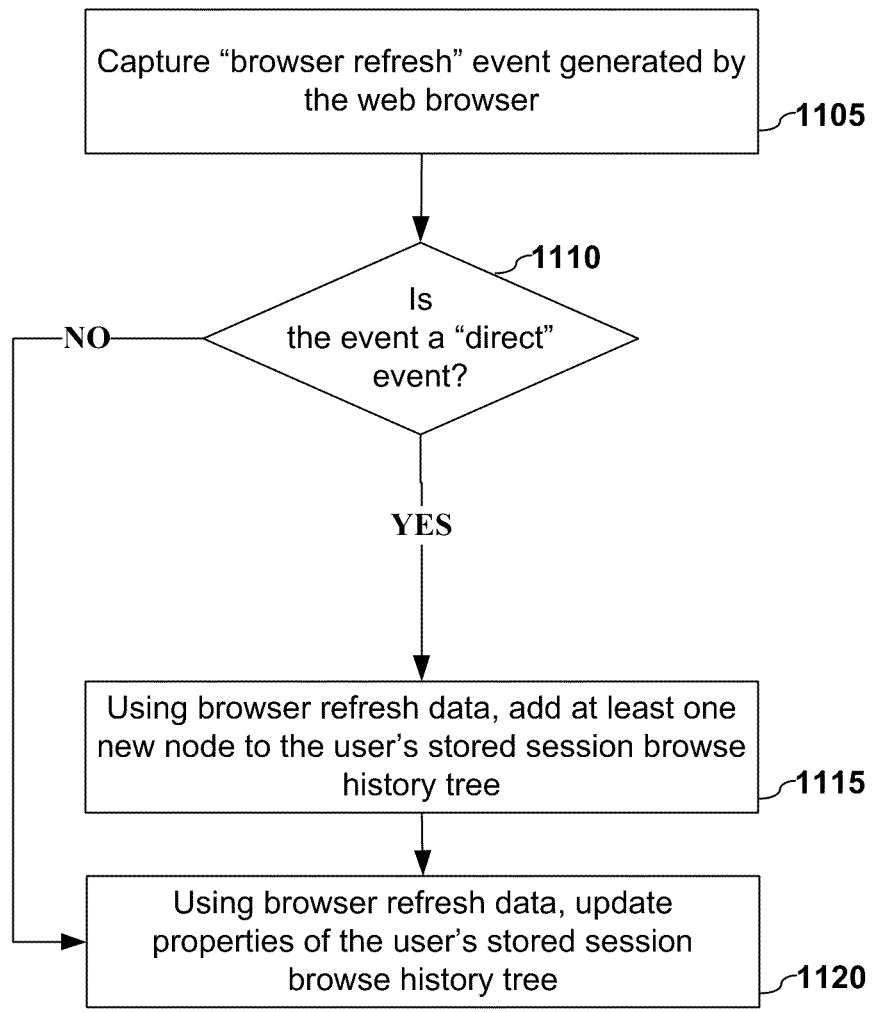
FIG. 11 depicts a method for updating a stored tree-based browse session history in response to a received browser event according to various embodiments of the invention.

FIG. 11 depicts a method 1100 for updating a stored tree-based browse session history 630 in response to a received browser event 605 according to various embodiments of the invention. Method 1100 may be implemented in embodiments of browser navigation system 600, and an exemplary scenario for responding to a received "browser refresh" browser event 805 is illustrated in FIG. 8.

A browser event 605 having a type belonging to a specified set of browser event types is captured 1105 by an event listener 610. As previously described, a browser event may be categorized as a "direct" event that is generated while processing a direct request by the user, or as an "indirect" event that is generated while processing the user's sequential or random access navigation interaction with the web browser UI.

In embodiments, the user's stored session browse history tree is updated using a set of data associated with the event. If the received browser event 605 is determined to be a "direct" event 1110, at least one new node is added 1115 to the stored session browse history tree, and tree properties (such as current node and path) are updated 1120. If the received browser event 605 is determined to be an "indirect" event 1110, tree properties (such as current node and path) are updated 1120, but no new node is added to the stored session browse history tree.

2. Methods for Handling UI Input

The following sections describe embodiments of methods for processing received web browser user input via the browser UI 615 according to various embodiments of the invention. The methods may be implemented in embodiments of browser navigation system 600.

a) Method for Processing a User-Initiated "Go To" Navigation Request

Figure 12:
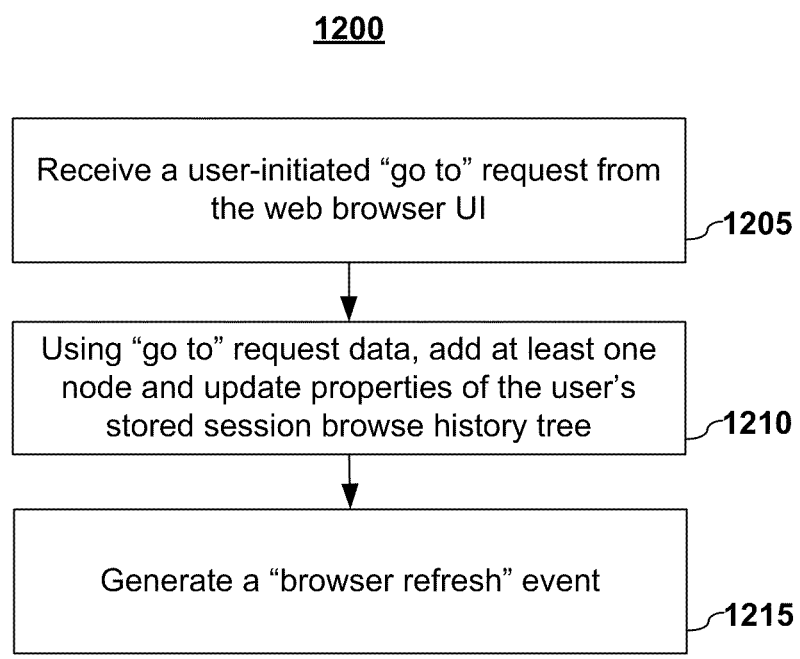
FIG. 12 depicts a method for processing a "go to" navigation request initiated by a user interacting with the browser UI according to various embodiments of the invention.

FIG. 12 depicts a method for processing a "go to" navigation request initiated by a user interacting with the browser UI. An exemplary "go to" navigation request processing scenario is illustrated in FIG. 9.

As previously described, a user may interact with the web browser UI to initiate a direct navigation request (e.g., a request entered by the user that specifies navigation to a URI). In embodiments, processing a "go to" request 905 that is received 1205 from the web browser UI includes updating 1210 the user's stored session browse history tree in the same way as an update is performed during processing of a "direct" event (steps 1115 and 1120 in method 1100). In embodiments, processing a received "go to" request 905 also comprises generating a "browser refresh" event 955 to be handled by the web browser.

As previously described, a "browser refresh" browser event may be captured by embodiments of browser navigation system 600, and handling the captured event may comprise updating the user's stored session browse history tree (steps 1115 and 1120 in method 1100).

In embodiments, request handler 650 may implement synchronization between method 1200 and method 1100 to insure that catching a browser refresh event 955 generated by browser system 600 will not result in a second update of the browse history. For example, in embodiments, the "go to" request data 945 from the UI elements processor 640 may comprise the URI of the page from which the request initiated, and, during processing (method 1200) of the "go to" request data 945, the request handler 650 may cache that URI as the value of a "last browser page UI request" property. If the browser refresh data 815 of a subsequently received browser refresh event 805 comprise the same initiating page URI as the cached value of the "last browser page UI request" property, the request handler 650 will recognize that it had previously generated the browser refresh event 955. In embodiments, the request handler 650 processing the recognized browser event (method 1100) may comprise clearing the cached property and will not comprise updating the browse history 630.

b) Method for Processing a UI Request for a Current Browse History

Figure 13:
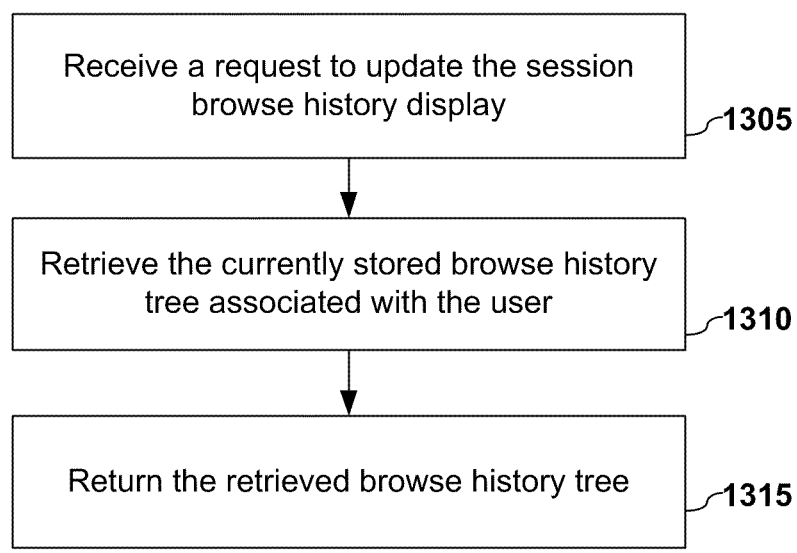
FIG. 13 depicts a method for processing a user request to view a display of the current session browse history tree according to various embodiments of the invention.

FIG. 13 depicts a method 1300 for processing a user request to view a display of the current session browse history tree according to various embodiments of the invention. An exemplary UI request processing scenario is illustrated in FIG. 10.

In embodiments, an instance of the user's stored session browse history tree is returned 1315 in response to receiving 1305 a request from the web browser UI. In embodiments, the instance of the user's stored session browse history tree may be retrieved 1310 as a "pull" operation from a persistent data store in response to receiving 1305 a data fetch request 1015. In other embodiments, the instance of the user's stored session browse history tree may be retrieved 1310 from a cached instance of the tree in response to receiving 1305 the data fetch request 1015. In embodiments, the cached instance of the tree is replaced with an instance of the stored browse history 1025 after receipt of a notification (e.g., via an event generated by the browse history 630 and/or by polling the browse history 630) that the stored browse history has been updated.

D. Computing System Implementations

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 14:
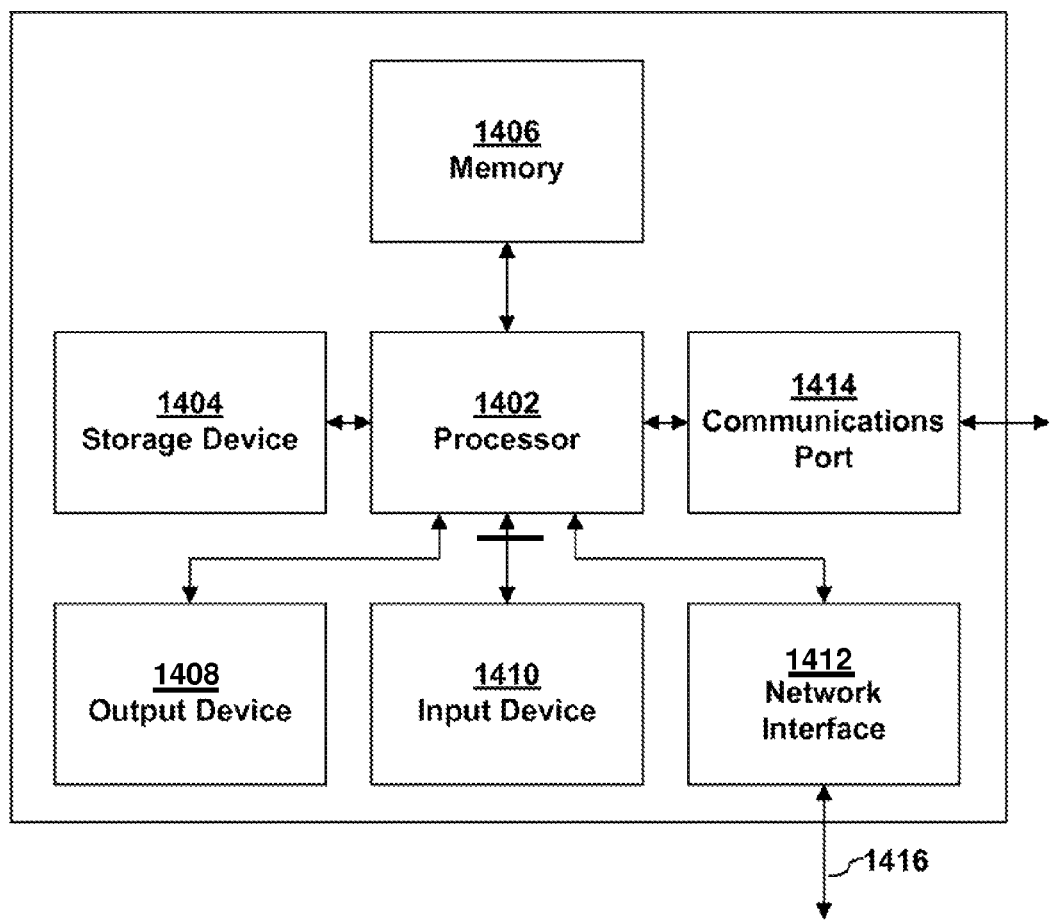
FIG. 14 depicts a block diagram of a computing system according to various embodiments of the invention.

FIG. 14 depicts a functional block diagram of an embodiment of an instruction-execution/computing device 1400 that may implement or embody embodiments of the present invention. As illustrated in FIG. 14, a processor 1402 executes software instructions and interacts with other system components. In an embodiment, processor 1402 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1404, coupled to processor 1402, provides long-term storage of data and software programs. Storage device 1404 may be a hard disk drive and/or another device capable of storing data, such as a magnetic or optical media (e.g., diskettes, tapes, compact disk, DVD, and the like) drive or a solid-state memory device. Storage device 1404 may hold programs, instructions, and/or data for use with processor 1402. In an embodiment, programs or instructions stored on or loaded from storage device 1404 may be loaded into memory 1406 and executed by processor 1402. In an embodiment, storage device 1404 holds programs or instructions for implementing an operating system on processor 1402. In one embodiment, possible operating systems include, but are not limited to, UNIX, AIX, LINUX, Microsoft Windows, and the Apple MAC OS. In embodiments, the operating system executes on, and controls the operation of, the computing system 1400.

An addressable memory 1406, coupled to processor 1402, may be used to store data and software instructions to be executed by processor 1402. Memory 1406 may be, for example, firmware, read only memory (ROM), flash memory, non-volatile random access memory (NVRAM), random access memory (RAM), or any combination thereof. In one embodiment, memory 1406 stores a number of software objects, otherwise known as services, utilities, components, or modules. One skilled in the art will also recognize that storage 1404 and memory 1406 may be the same items and function in both capacities. In an embodiment, one or more of the components of FIGS. 6-10 may be modules stored in memory 1404, 1406 and executed by processor 1402.

In an embodiment, computing system 1400 provides the ability to communicate with other devices, other networks, or both. Computing system 1400 may include one or more network interfaces or adapters 1412, 1414 to communicatively couple computing system 1400 to other networks and devices. For example, computing system 1400 may include a network interface 1412, a communications port 1414, or both, each of which are communicatively coupled to processor 1402, and which may be used to couple computing system 1400 to other computer systems, networks, and devices.

In an embodiment, computing system 1400 may include one or more output devices 1408, coupled to processor 1402, to facilitate displaying graphics and text. Output devices 1408 may include, but are not limited to, a display, LCD screen, CRT monitor, printer, touch screen, or other device for displaying information. Computing system 1400 may also include a graphics adapter (not shown) to assist in displaying information or images on output device 1408.

One or more input devices 1410, coupled to processor 1402, may be used to facilitate user input. Input device 1410 may include, but are not limited to, a pointing device, such as a mouse, trackball, or touchpad, and may also include a keyboard or keypad to input data or instructions into computing system 1400.

In an embodiment, computing system 1400 may receive input, whether through communications port 1414, network interface 1412, stored data in memory 1404/1406, or through an input device 1410, from a scanner, copier, facsimile machine, or other computing device.

In embodiments, computing system 1400 may include one or more databases, some of which may store data used and/or generated by programs or applications. In embodiments, one or more databases may be located on one or more storage devices 1404 resident within a computing system 1400. In alternate embodiments, one or more databases may be remote (i.e. not local to the computing system 1400) and share a network 1416 connection with the computing system 1400 via its network interface 1414. In various embodiments, a database may be a relational database, such as an Oracle database, that is adapted to store, update, and retrieve data in response to SQL-formatted commands.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A computer-implemented browser user interface (UI) encoded on a non-transitory computer-readable medium comprising a navigation display that provides access to browse history of a session, the browser UI comprising:

a session forward icon that, responsive to a user selecting the session forward icon, causes the navigation display to display a first portion of a tree-based session browse history comprising link nodes, wherein each link node is associated with a Universal Resource Identifier (URI), the first portion of the tree-based session browse history corresponding to a set of link nodes that have been visited by the user in the session positioned after a currently visited link node;

a session backward icon that, responsive to the user selecting the session backward icon, causes the navigation display to display a second portion of the tree-based session browse history comprising link nodes, wherein each link node is associated with a URI, the second portion of the tree-based session browse history corresponding to a set of link nodes that have been visited by the user in the session positioned before the currently visited link node; and at least one session browsing history drop-down menu icon, which allows the user to view at least a subset of the tree-based session browse history using a session browse history drop-down menu, wherein the displayed session browse history drop-down menu contains a plurality of link nodes from a plurality of browse history branches created during the session, wherein the plurality of link nodes are displayed as an inverted tree that shows a root link node at the top of the session browse history drop-down menu and shows the currently visited link node in a trunk of the inverted tree, and wherein each child link node in the trunk of the inverted tree is displayed below its parent link node and a child link node in a branch of the inverted tree is displayed horizontally adjacent to its parent link node, wherein the user is allowed to select a link node from the displayed session browse history drop-down menu for random access navigation, and wherein the tree-based session history display is updated in response to the user's selection of another link node in the branch, wherein the another link node is displayed in the trunk of the inverted tree of the updated tree-based session history display.

2. The computer-implemented browser UI of claim 1 wherein selection of a link node causes the browser to navigate to the URI associated with the link node.

3. The computer-implemented browser UI of claim 2 wherein a first link node in the tree-based session browse history has a set of one or more child link nodes, and the navigation display comprises the first link node and an icon representing the presence of the set of child link nodes that, responsive to the user selecting the icon, updates the navigation display to comprise the first link node and at least some of the set of child link nodes.

4. The computer-implemented browser UI of claim 3 wherein the browser UI further comprises a session browsing history icon that, responsive to the user selecting the session browsing history icon, causes the navigation display to provide access to a complete tree-based session browse history.

5. The computer-implemented browser UI of claim 4 wherein access to the complete tree-based session browse history is provided by displaying a portion of the complete tree-based session browse history and an indicator that provides access to an undisplayed portion of the complete tree-based session browse history, which undisplayed portion is displayed in response to the user selecting the indicator.

6. The computer-implemented browser UI of claim 5 wherein the navigation display adjusts around a link node that is selected by the user.

7. The computer-implemented browser UI of claim 4 wherein the browser UI further comprises:
   a "save" icon that, in response to the user selecting the "save" icon, causes the tree-based session browse history to be saved; and
   an "open" icon that, in response to the user selecting the "open" icon, allows the user to select a previously saved browser session history, and causes the selected session browse history to be imported and added to the tree-based session browse history.

8. The computer-implemented browser UI of claim 7 wherein the navigation display is updated to display at least a portion of the saved tree-based session browse history that was imported.

9. The computer-implemented browser UI of claim 1 wherein the browser UI further comprises:
   a "back" session navigation icon, that causes the browser to perform sequential navigation to a link node visited just prior to the currently visited link node in response to the user selecting the "back" session navigation icon, the link node being identified based on a current value of a path property of the tree-based session browse history; and
   a "forward" session navigation icon, that causes the browser to perform sequential navigation to a link node visited just after the currently visited link node in response to the user selecting the "forward" session navigation icon, the link node being identified based on a current value of a path property of the tree-based session browse history.

10. The computer-implemented browser UI of claim 1 wherein the session browse history is displayed as an invert tree, which has a root node at top of the invert tree and each child link node on a trunk of the invert tree, and wherein each child link node on a branch is displayed horizontally adjacent to its parent link node.

11. The computer-implemented browser UI of claim 1 wherein the at least one session browsing history drop-down menu icon presents choices for different views of subsets of previously visited URIs.

12. The computer-implemented browser UI of claim 11 wherein the presented choices includes a backward view of the previously visited URIs and a forward view of the previously visited URIs.

13. The computer-implemented browser UI of claim 1 wherein a separate stack-based path history is maintained in addition to the tree-based session browse history.

14. The computer-implemented browser UI of claim 1 wherein the displayed session browse history stores browse history branches created during the session from a link node when new link nodes are added to the browse history.

15. A computer processing system encoded on a non-transitory computer-readable medium for providing a navigation display within a browser UI, the system comprising:
   a user interface (UI) elements processor, that:
      dispatches a task processing request associated with input data to a request handler in response to receiving the input data from the browser UI, and
      provides the navigation display within the browser UI in response to receiving a task processing result from the request handler, the navigation display comprising:
         a session forward icon that, responsive to a user selecting the session forward icon, causes the navigation display to display a first portion of a tree-based session browse history comprising link nodes, wherein each link node is associated with a Universal Resource Identifier (URI), the first portion of the tree-based session browse history corresponding to a set of link nodes that have been visited by the user in the session positioned after a currently visited link node;
         a session backward icon that, responsive to the user selecting the session backward icon, causes the navigation display to display a second portion of the tree-based session browse history comprising link nodes, wherein each link node is associated with a URI, the second portion of the tree-based session browse history corresponding to a set of link nodes that have been visited by the user in the session positioned before the currently visited link node; and
         at least one session browsing history drop-down menu icon, which allows the user to view at least a subset of the tree-based session browse history using a session browse history drop-down menu, wherein the displayed session browse history drop-down menu contains a plurality of link nodes from a plurality of browse history branches created during the session, wherein the plurality of link nodes are displayed as an inverted tree that shows a root link node at the top of the session browse history drop-down menu and shows the currently visited link node in a trunk of the inverted tree, and wherein each child link node in the trunk of the inverted tree is displayed below its parent link node and a child link node in a branch of the inverted tree is displayed horizontally adjacent to its parent link node, wherein the user is allowed to select a link node from the displayed session browse history drop-down menu for random access navigation, and wherein the tree-based session history display is updated in response to the user's selection of another link node in a branch, wherein the another link node is displayed in the trunk of the inverted tree of the updated tree-based session history display;
   the request handler, that, in response to receiving the processing task request associated with the input data, generates the task processing result by executing a task comprising accessing the tree-based browse history; and
   a browse history manager, that accesses a stored representation of the tree-based browse history in response to receiving a browse history access request from the request handler.

16. The computer processing system of claim 15 wherein the task processing request associated with the input data is updating the tree-based session browse history, and executing the task comprises:
   retrieving a stored representation of the tree-based session browse history from data storage;
   responsive to the input data comprising a Universal Resource Identifier (URI) that is not associated with a link node within the retrieved tree-based session browse history, adding a first link node associated with the URI to the tree-based session browse history by:
      creating the first link node associated with the URI;

identifying a second link node within the tree-based session browse history that is currently being visited by the user; and adding the first link node to a set of child link nodes associated with the second link node;

updating a set of properties associated with the tree-based session browse history, the set of properties comprising "current node" and "current path"; and storing a representation of the updated tree-based history in the data storage.

17. The computer processing system of claim 16 further comprising an on-event listener that dispatches the task processing request associated with a browser-generated event to the request handler in response to receiving the event.

18. A computer program product comprising at least one non-transitory computer-readable medium storing one or more sequences of instructions, wherein execution of the one or more sequences of instructions by one or more processors causes the one or more processors to execute a computer-implemented method for providing a navigation display that provides access to browse history, the method comprising:

providing a session forward icon that, responsive to a user selecting the session forward icon, causes the navigation display to display a first portion of a tree-based session browse history comprising link nodes, wherein each link node is associated with a Universal Resource Identifier (URI), the first portion of the tree-based session browse history corresponding to a set of link nodes that have been visited by the user in the session positioned after a currently visited link node;

providing a session backward icon that, responsive to the user selecting the session backward icon, causes the navigation display to display a second portion of the tree-based session browse history comprising link nodes, wherein each link node is associated with a URI, the second portion of the tree-based session browse history corresponding to a set of link nodes that have been visited by the user in the session positioned before the currently visited link node; and providing at least one session browsing history drop-down menu icon, which allows the user to view at least a subset of the tree-based session browse history using a session browse history drop-down menu, wherein the displayed session browse history drop-down menu contains a plurality of link nodes from a plurality of browse history branches created during the session, wherein the plurality of link nodes are displayed as an inverted tree that shows a root link node at the top of the session browse history drop-down menu and shows the currently visited link node in a trunk of the inverted tree, and wherein each child link node in the trunk of the inverted tree is displayed below its parent link node and a child link node in a branch of the inverted tree is displayed horizontally adjacent to its parent link node, wherein the user is allowed to select a link node from the displayed session browse history drop-down menu for random access navigation, and wherein the tree-based session history display is updated in response to the user's selection of another link node in a branch, wherein the another link node is displayed in the trunk of the inverted tree of the updated tree-based session history display.

\* \* \* \* \*